United States Patent Office 3,276,913
Patented Oct. 4, 1966

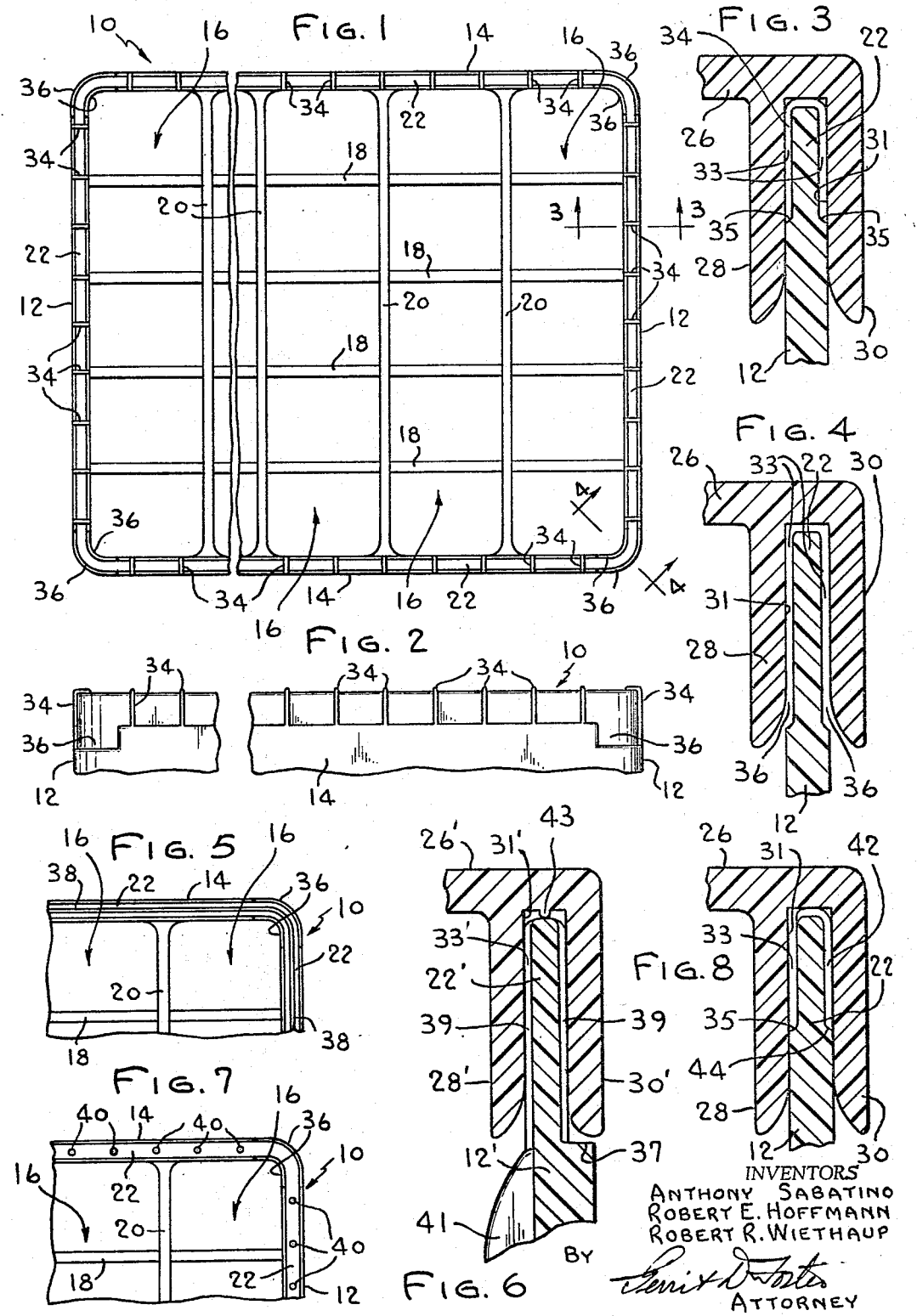

3,276,913
ONE PIECE BATTERY COVER
Anthony Sabatino, Milwaukee, Robert E. Hoffmann, Oconomowoc, and Robert R. Wiethaup, Milwaukee, Wis., assignors to Globe-Union Inc., Milwaukee, Wis., a corporation of Delaware
Filed Mar. 20, 1963, Ser. No. 266,724
11 Claims. (Cl. 136—170)

This invention relates to storage batteries and, more particularly, to an improved cover and case arrangement therefor.

In a generally accepted type of storage battery construction, a one piece cover is assembled onto a battery case. An adhesive cement, such as epoxy resin, is used to secure the cover to the case and, also, to assist in providing a seal at the point of connection between the cover and case to prevent leakage of battery electrolyte out of the case or leakage of water, or other foreign substances, into the case.

The primary object of this invention is to provide an improved sealed connection between the cover and case of an electric storage battery.

For the achievement of this and other objects, this invention contemplates the provision of spacing means in the joint between the cover and case to maintain a predetermined spacing therebetween which will insure an even distribution of adhesive cement throughout the joint. Battery covers and cases constructed in accordance with this invention also lend themselves particularly well to the provision, is desired, of intimate engagement between the battery case and cover to form a mechanical seal and prevent leakage of adhesive cement from the point of connection between the cover and case.

Other objects and advantages will be pointed out in, or be apparent from, the description and claims, as will obvious modifications of the embodiments shown in the drawing, in which:

FIG. 1 is a top plan view of the case with a section broken away;

FIG. 2 is a side elevation of the case with a section broken away;

FIG. 3 is a view taken generally along lines 3—3 of FIG. 1 and showing a portion of the one piece cover as mounted on the case;

FIG. 4 is a partial section view along lines 4—4 of FIG. 1 with the one piece cover in place;

FIG. 5 is a partial top plan view of an alternative arrangement of this invention;

FIG. 6 is a partial section through the cover and case illustrating another alternative of this invention;

FIG. 7 is a view of yet another alternative arrangement of this invention; and

FIG. 8 is a view of still another alternative arrangement of this invention.

Referring more particularly to the drawing, a molded battery case 10 includes end walls 12 and side walls 14. The case is divided into a number of cells 16 by integrally molded transverse partitions 20 and supporting flanges 18. The upper portion of the case is preferably formed with a reduced thickness segment, or in other words a segment having a reduced cross-sectional area, to provide a lip 22 extending around the entire case periphery.

A one piece cover 26 (partly shown in FIGS. 3, 4, 6 and 8,) includes depending side walls 28 and 30 forming a groove 31 therebetween which extends around the entire periphery of the cover. In assembly, the upper portion of the case, lip 22, is receivable in groove 31 and a suitable adhesive cement is placed in the groove prior to assembly. The adhesive cement should uniformly fill the space between lip 22 and the walls of groove 31 and, preferably leakage of the cement from that space should be prevented in order to insure an adequate sealed connection between the cover and case. With the reduced thickness segment the upper portion of the battery case is provided with oppositely facing surfaces, the oppositely facing surfaces of the reduced thickness segment, which are spaced from and have a substantial extension in confronting relationship with the groove walls. Moreover, by providing the reduced thickness segment or lip 22 on the case, spacing means can be provided intermediate lip 22 and the inner walls of groove 31 to maintain a predetermined spacing therebetween to effect uniform and complete distribution of adhesive cement around the lip and between it and the groove walls. As illustrated in FIGS. 1, 2 and 3, the spacing means may take the form of ribs 34 extending from contoured portions 35, which are provided to assist in aligning the lip 22 in groove 31, along the sides and over the top of lip 22, i.e. an inverted U-shaped rib over lip 22. A plurality of ribs 34 are relatively spaced around the periphery of the battery case, as illustrated in FIGS. 1 and 2, to maintain the minimum spacing between the walls of groove 31 and the lip 22 and insure uniform and complete distribution of the adhesive cement. To further enhance the sealed connection between the cover and case, depending side walls 28 and 30 can be arranged to mechanically and intimately engage the side and end walls of the case to provide an enclosed area 33 for retention of the cement. In FIG. 3 side walls 28 and 30 are shown in engagement with an end wall 12 of the case. The engagement of depending side walls 28 and 30 with the end and side walls of the case forms a mechanical seal to hold the adhesive cement in groove 31 and prevent leakage of the cement from enclosed area 33, thereby insuring an adequate, sealed connection between the cover and case.

Although this invention is discussed in connection with a lip formed by a portion of reduced thickness at the top of the case walls, which is the preferred arrangement from a molding standpoint, it is conceivable that other arrangements could be used. For example, the case walls could be of uniform thickness throughout with the spacing ribs extending laterally thereof to provide requisite spacing. Furthermore, where it becomes desirable to provide the mechanical seal between the cover and case, i.e. engagement of the case with the groove forming side walls of the cover, a case of uniform thickness could be used with portions built out and extending around the case for engagement with the groove forming walls.

The cover and case are molded parts and tolerances cannot be accurately held on the mating surfaces of the case and cover, therefore, cut-away portions 36 are provided at the corners of the case. The depending walls 28 and 30 at the corners of the cover are substantially rigid, not flexible as are the portions of the depending walls extending between the corners, and the cut-away portions eliminate what would otherwise be high stress concentration areas in the cover which would be highly susceptible to rupture. As can be seen in FIG. 4, the cut-away portions provide a greater downward extension to lip 22 and of an amount to clear the depending walls 28 and 30 so that the cover corners are not stressed. Due to the rigidity of the cover corners, which eliminates the tendency of the depending walls to pull away from the lip as is the case with the remainder of the depending walls, an adequate sealed connection is achieved at the corners even with the cut-away portions. Thus, with the present state of development of storage battery manufacturing techniques, the length of lip 22 is uniform over a major portion of the extension of the end and side walls of the case with these uniform length portions terminating in spaced relation from the corners where the length of the reduced thickness lip is increased to provide cut-away portions 36 so that the depending walls of the cover do not engage the corners of the case; however, it is appreciated that with future improvements in manufacturing techniques, which may permit closer tolerances, the cut-away portions may be eliminated and the lip made of uniform length so that depending walls 28 and 30 can be engaged with the case completely around the case.

An alternative arrangement is illustrated in FIG. 5. In this arrangement depending walls 28 and 30 again engage the casing to mechanically seal against leakage of adhesive cement. However, in this arrangement the uniform spacing between lip 22 and the inner walls of groove 31 is maintained by a bead 38 positioned at the top of the lip 22 for engagement with the groove walls. Bead 38 extends co-extensively with the lip 22 around the cover. It will be appreciated that the bead 38 could be broken up into separate, relatively spaced lengths positioned around the lip; or the bead could be replaced by a series of relatively spaced dimples 40 illustrated in FIG. 7. Furthermore, it is recognized that the bead or dimples could be provided on the walls of the groove and arranged to engage lip 22 to maintain the predetermined spacing.

FIG. 6 illustrates an embodiment wherein a portion of the spacing medium is provided on cover 26'. Battery side wall 12', in this embodiment, illustrates another common type of case construction wherein the case is provided with a laterally projecting ledge 37 extending completely around the periphery of the case. Lip 22' is provided at the top of the side wall and is received within groove 31'. Lip 22' includes inner and outer vertical ribs 39, the outer rib extending upwardly from ledge 37 to terminate in line with the top of the lip and the inner rib extending between the spacer 41 and the top of the lip. Vertical ribs 39 prevent depending side walls 28' and 30' from directly engaging the lip sides thereby maintaining a space therebetween for even distribution of adhesive cement. The spacing between the cover and the top of the lip is provided by a bead 43 molded on the upper wall of groove 31' and extending completely around groove 31' similar to the bead 38 (FIG. 5) provided on the case. Obviously, the bead could be broken up into separate, relatively spaced lengths or could be replaced by a series of dimples on the cover similar to those illustrated in FIG. 7 on the lip.

FIG. 8 illustrates yet another alternative arrangement of this invention. In this arrangement a rib 42 extends from the outer juncture 44 between side wall 12 and lip 22 along and onto the top surface of lip 22, terminating on the top surface of the lip 22. This arrangement also provides a mechanical seal between the cover and case and maintains the predetermined spacing between the lip and the inner groove walls.

In accordance with this invention, spacing means can be included intermediate the upper end of the case and the cover inner groove walls to maintain a predetermined spacing therebetween. Furthermore, leakage of the adhesive cement may be prevented by providing a mechanical seal between the cover and case which is effective to hold the adhesive cement in the groove. The number of examples discussed herein are not intended as limitations on this invention, but are given merely as examples of the many alternatives which are possible within the scope of this invention for it is appreciated that the spacing means, as well as the arrangement for providing the mechanical seal, can take many forms other than those discussed herein. Accordingly, although only a few embodiments of the present invention have been illustrated and described, it will be apparent to those skilled in the art, that various changes and modifications may be made therein without departing from the spirit of the invention or from the scope of the appended claims.

What we claim is:

1. A storage battery comprising, a case, a cover on said case, one of said case and cover including means defining an open ended groove receiving a portion of the other, adhesive means in said groove, and spacing means disposed within said groove throughout the juncture between said case and cover and protruding from one of said case and cover, said spacing means maintaining a predetermined spacing between said portion and the walls of said groove with said adhesive means being distributed uniformly and completely between said portion and said groove walls throughout the juncture between said case and cover.

2. A storage battery comprising, a case, a cover on said case, one of said case and cover including relatively spaced wall means defining an open ended groove receiving a portion of the other, said wall means engaging and forming a sealed connection with said portion and said portion including a reduced thickness area adjacent its free extremity and positioned wholly within said groove so that a substantially sealed area is provided between said wall means and said portion, adhesive means in said groove, and spacing means within said groove throughout the juncture between said case and cover and protruding from one of said case and cover, said spacing means maintaining a predetermined spacing between said reduced thickness area and the walls of said groove with said adhesive means being distributed uniformly and completely throughout said sealed area.

3. A storage battery comprising, a case, a cover on said case including relatively spaced wall means defining an open ended groove, the upper portion of said case being characterized by having a reduced thickness segment adjacent its free extremity, said upper case portion including the reduced thickness segment being wholly received in said groove with said wall means engaging said case and said reduced thickness segment arranged within said groove beyond the point of engagement of said wall means, and said case, said reduced thickness segment having oppositely facing surfaces which have a substantial extension in confronting relation with the walls of said groove so that a substantially sealed area is provided between said wall means and said reduced thickness segment, and adhesive means in said groove.

4. A storage battery comprising, a case, a cover on said case including relatively spaced wall means defining an open ended groove, the upper portion of said case including a reduced thickness segment adjacent its free extremity, said upper case portion including the reduced thickness segment being wholly received in said groove with said wall means engaging said upper case portion and said reduced thickness segment being arranged within said groove, said reduced thickness segment having oppositely facing surfaces which have a substantial extension in confronting relation with the walls of said groove so that a substantially sealed area is provided between said wall means and said reduced thickness segment, adhesive means in said groove, and protuberant facing means intermediate said reduced thickness segment and the walls of said groove maintaining a predetermined spacing between said reduced thickness segment and said groove walls throughout the juncture between said case and cover so that said adhesive means is distributed uniformly and completely throughout said sealed area which sealed area comprises substantially all the opposed surfaces of said groove walls and said reduced thickness segment.

5. A storage battery comprising, a case, a cover on said case including relatively spaced wall means defining an open ended groove, the upper portion of said case including a reduced thickness segment adjacent its free extremity, said upper case portion and the reduced thickness segment thereof being wholly received in said groove with said wall means engaging said upper case portion and defining therewith a substantially sealed area between said wall means and said reduced thickness segment, adhesive means in said groove, means intermediate said reduced thickness segment and the walls of said groove maintaining a predetermined spacing between said reduced thickness segment and said groove walls throughout the juncture between said case and cover and said adhesive means being distributed uniformly and completely throughout said sealed area which sealed area comprises substantially all the opposed surfaces of said groove walls and said reduced thickness segment, said case and cover having a generally rectangular configuration and said reduced thickness segment of said case extending substantially coextensively with the walls of said case and being characterized by having a greater downward extension at said corners and said cover being spaced from and out of engagement with said upper case portion at the corners thereof.

6. A storage battery comprising, a case, a cover on said case including relatively spaced wall means defining an open ended groove, the upper portion of said case including a reduced thickness segment adjacent its free extremity, said upper case portion and the reduced thickness segment thereof being wholly received in said groove with said wall means engaging said upper case portion and defining therewith a substantially sealed area between said wall means and said reduced thickness segment, adhesive means in said groove, spacing means comprising a plurality of generally U-shaped ribs extending over said reduced thickness segment and engaging the walls of said groove, said ribs being relatively thin and relatively spaced on said reduced thickness segment around the periphery of the upper case portion and maintaining a predetermined spacing between said reduced thickness segment and said groove walls throughout the juncture between said case and cover and said adhesive means being distributed uniformly and completely throughout said sealed area which sealed area comprises substantially all the opposed surfaces of said groove walls and said reduced thickness segment.

7. A storage battery comprising, a case, a cover on said case including relatively spaced wall means defining an open ended groove, the upper portion of said case including a reduced thickness segment adjacent its free extremity, said upper case portion and the reduced thickness segment thereof being wholly received in said groove with said wall means engaging said upper case portion and defining therewith a substantially sealed area between said wall means and said reduced thickness segment, adhesive means in said groove, spacing means comprising a continuous bead extending coextensively with said reduced thickness segment and disposed intermediate said reduced thickness segment and said groove walls and maintaining a predetermined spacing between said reduced thickness segment and said groove walls throughout the juncture between said case and cover and said adhesive means being distributed uniformly and completely throughout said sealed area which sealed area comprises substantially all the opposed surfaces of said groove walls and said reduced thickness segment.

8. The storage battery of claim 7 wherein said continuous bead is provided on the top of said reduced thickness segment.

9. The storage battery of claim 7 wherein said continuous bead is provided on said cover and arranged for engagement with the top of said reduced thickness segment of the upper case portion.

10. A storage battery comprising, a case, a cover on said case including relatively spaced wall means defining an open ended groove, the upper portion of said case including a reduced thickness segment adjacent its free extremity, said upper case portion and the reduced thickness segment thereof being wholly received in said groove with said wall means engaging said upper case portion and defining therewith a substantially sealed area between said wall means and said reduced thickness segment, adhesive means in said groove, spacing means comprising a plurality of relatively spaced ribs extending along one of the oppositely facing sides of said reduced thickness segment onto the uppermost portion of said reduced thickness segment and engaging the walls of said groove, said ribs maintaining a predetermined spacing between said reduced thickness segment and said groove walls throughout the juncture between said case and cover and said adhesive means being distributed uniformly and completely throughout said sealed area which sealed area comprises substantially all the opposed surfaces of said groove walls and said reduced thickness segment.

11. A storage battery comprising, a case, a cover on said case including relatively spaced wall means defining an open ended groove, the upper portion of said case including a reduced thickness segment adjacent its free extremity, said upper case portion and the reduced thickness segment thereof being wholly received in said groove with said wall means engaging said upper case portion and defining therewith a substantially sealed area between said wall means and said reduced thickness segment, adhesive means in said groove, spacing means comprising a plurality of separate projections intermediate said reduced thickness segment portion and the walls of said groove maintaining a predetermined spacing between said reduced thickness segment and said groove walls throughout the juncture between said case and cover and said adhesive means being distributed uniformly and completely throughout said sealed area which sealed area comprises substantially all the opposed surfaces of said groove walls and said reduced thickness segment.

References Cited by the Examiner

UNITED STATES PATENTS

| 2,031,438 | 2/1936 | Wallace | 136—170 |
| 2,221,542 | 11/1940 | Hopkins | 136—170 |
| 2,890,262 | 6/1959 | Kendall et al. | 136—170 |
| 2,942,055 | 6/1960 | Doyle et al. | 136—170 |

WINSTON A. DOUGLAS, *Primary Examiner.*

JOHN H. MACK, *Examiner.*

D. L. WALTON, *Assistant Examiner.*